July 8, 1930.  O. E. SZEKELY  1,769,975
OIL RING
Filed Oct. 3, 1927
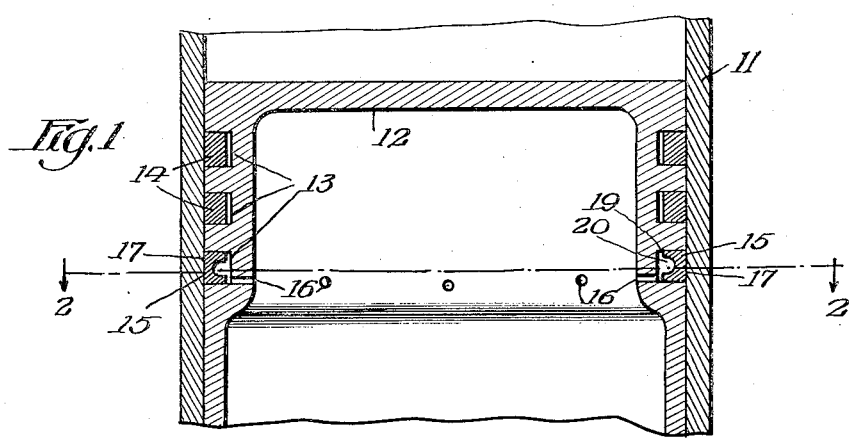
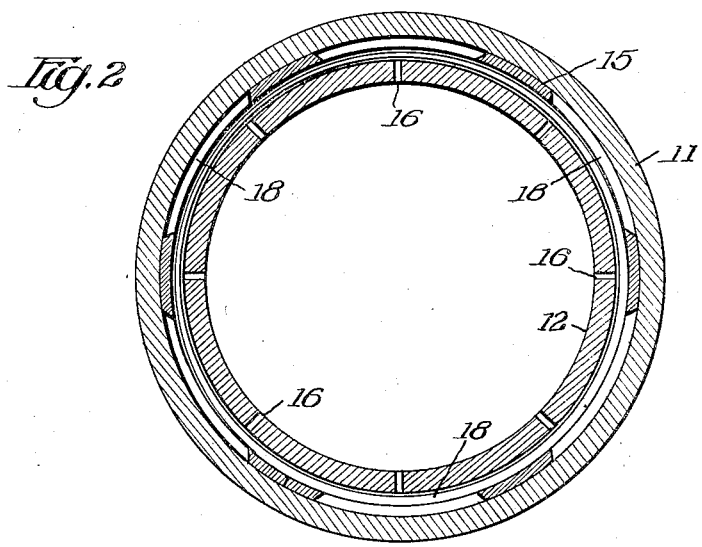
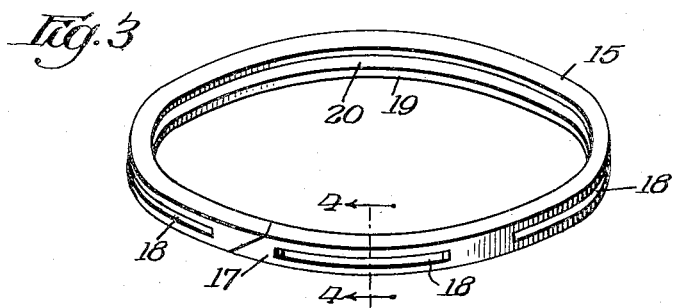
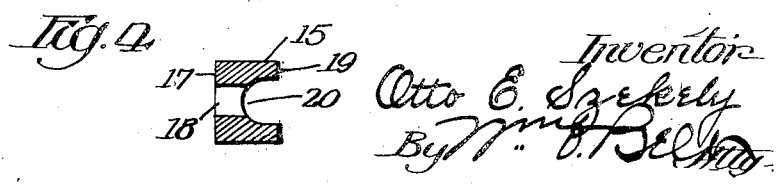
Inventor
Otto E. Szekely Patented July 8, 1930

1,769,975

UNITED STATES PATENT OFFICE

OTTO E. SZEKELY, OF HOLLAND, MICHIGAN

OIL RING

Application filed October 3, 1927. Serial No. 223,553.

This invention relates to oil rings for internal combustion engine pistons and the object of the invention is to provide an oil ring having novel improved means for removing the surplus oil from the cylinder walls and returning it to the crank case.

Another object of the invention is to provide an oil ring having an enlarged chamber for the collection of surplus oil which will ultimately be fed to the cylinder walls and piston after it has been returned to the crank case.

The accompanying drawing illustrates a selected embodiment of the invention and the views therein are as follows:

Fig. 1 is a vertical sectional view through an engine cylinder and showing my invention.

Fig. 2 is a transverse sectional view on the line 2—2 of Fig. 1.

Fig. 3 is a perspective view of my novel oil ring.

Fig. 4 is a detail sectional view on the line 4—4 of Fig. 3.

Referring to the drawings 11 designates a cylinder in which the piston 12 reciprocates. The piston is provided with the usual piston ring grooves 13 in which the ordinary piston ring 14 and my improved oil ring 15 are arranged. The piston is provided with a plurality of openings 16 extending through the inner side of the piston and connecting with the lower groove 13.

A plurality of spaced elongated slots 18 in the outer face 17 of the oil ring 15 communicate with a continuous annular groove 20 in the inner face 19 of the ring. Surplus oil on the cylinder walls may be collected in the slots and flow into the annular groove and the ducts 16 into the crank case.

In many conventional rings now in use the clearance between the inner face of the ring and the bottom of the groove in the piston is only about .015 inches and any oil which may be wiped from the cylinder wall is forced from this clearance space through openings in the piston into the usual chamber within the piston and passes to the crank case. The slots 18 in my ring receive surplus oil from the cylinder wall and conduct it to the groove 20 which provides an enlarged chamber to receive the oil and from which the oil readily flows through the openings 16 into the piston and on to the crank case.

With my oil ring the surplus oil will be more quickly removed from the cylinder walls and conducted to the crank case than has been possible heretofore. Since the elongated slots are adapted to collect any ordinary quantity of surplus oil there may be on the cylinder wall and conduct it immediately to the groove which constitutes a spacious receiving chamber adapted to hold the oil until it passes through the openings into the piston and without restricting the collection of oil by the slots or the flow of oil into the piston. In other words, it may be said that all surplus oil is immediately removed from the cylinder wall by the ring and conducted to an enlarged receiving chamber from which it flows through the usual openings into the piston without backing up and returning to the cylinder wall.

Changes may be made in the form, construction and arrangement of the parts without departing from the spirit or sacrificing any of the advantages of the invention, and I reserve the right to make all such changes as fairly fall within the scope of the following claim.

I claim:

A piston ring substantially rectangular in cross-section and having an annular groove in its inner face forming a continuous enlarged oil receiving chamber and a plurality of elongated slots arranged end to end and spaced apart in its outer face and communicating directly throughout their length with the groove, said groove and slots being located in substantially the same horizontal plane intermediate of the top and bottom face of the ring.

OTTO E. SZEKELY.